(12) United States Patent
Johansen

(10) Patent No.: US 7,679,648 B2
(45) Date of Patent: Mar. 16, 2010

(54) METHOD AND APPARATUS FOR CODING A SECTIONAL VIDEO VIEW CAPTURED BY A CAMERA AT AN END-POINT

(75) Inventor: Tom-Ivar Johansen, Oslo (NO)

(73) Assignee: Tandberg Telecom AS, Lysaker (NO)

( * ) Notice: Subject to any disclaimer, the term of this patent is extended or adjusted under 35 U.S.C. 154(b) by 1148 days.

(21) Appl. No.: 11/233,498

(22) Filed: Sep. 22, 2005

(65) Prior Publication Data

US 2006/0139466 A1      Jun. 29, 2006

(30) Foreign Application Priority Data

Sep. 27, 2004    (NO) .................................. 20044085

(51) Int. Cl.
*H04N 5/232* (2006.01)
*H04N 7/14* (2006.01)

(52) U.S. Cl. .............................. 348/211.12; 348/14.12; 348/208.13; 348/208.14; 348/222.1

(58) Field of Classification Search ....................... None
See application file for complete search history.

(56) References Cited

U.S. PATENT DOCUMENTS

| | | | | |
|---|---|---|---|---|
| 5,821,986 A | * | 10/1998 | Yuan et al. | 348/14.12 |
| 6,184,926 B1 | | 2/2001 | Khosravi et al. | |
| 6,369,848 B1 | * | 4/2002 | Ohkubo | 348/14.08 |
| 6,563,528 B2 | * | 5/2003 | Satoda | 348/14.05 |
| 6,738,534 B2 | * | 5/2004 | Ridge et al. | 382/299 |
| 6,757,434 B2 | * | 6/2004 | Miled et al. | 382/236 |
| 6,792,148 B1 | * | 9/2004 | Wergeland et al. | 382/232 |
| 7,236,629 B2 | * | 6/2007 | Cooper et al. | 382/171 |
| 7,399,128 B2 | * | 7/2008 | Ike et al. | 396/427 |
| 2002/0036780 A1 | * | 3/2002 | Nakamura | 358/1.2 |
| 2004/0070666 A1 | * | 4/2004 | Bober et al. | 348/14.01 |
| 2004/0234143 A1 | * | 11/2004 | Hagai et al. | 382/238 |

FOREIGN PATENT DOCUMENTS

WO       WO 03/067517 A2       8/2003

\* cited by examiner

*Primary Examiner*—Ngoc-Yen T Vu
(74) *Attorney, Agent, or Firm*—Oblon, Spivak, McClelland, Maier & Neustadt, L.L.P.

(57) ABSTRACT

The present invention utilizes video compression techniques in providing multi display and user control of picture layout with a single non-mechanical camera. According to a preferred embodiment of the present invention, a subsection of interest within a general view captured by the camera is coded based on the prediction of the main picture. In one aspect of the embodiment, scaling of the predicted pixel values in the subsection to match with the corresponding raw pixel data of extended resolution is carried out before subtracting the prediction from the raw data to provide the residual in the coding process. In a second aspect, the frame rate and the number of quantization intervals are increased when coding the subsection relative to the coding of the general view.

14 Claims, 3 Drawing Sheets

METHOD AND APPARATUS FOR CODING A SECTIONAL VIDEO VIEW CAPTURED BY A CAMERA AT AN END-POINT

RELATED APPLICATION

This application claims priority under 35 U.S.C. § 119 or 365 to Norwegian Application No. 20044085, filed Sep. 27, 2004. The entire teachings of the above application are incorporated herein by reference.

BACKGROUND

Transmission of moving pictures in real-time is employed in several applications e.g. video conferencing, net meetings, TV broadcasting and video telephony.

A conventional videoconferencing end-point includes a camera lens system rotary connected to a camera base for capturing a scene of interest, such as the environs adjacent table as well as conference participants themselves. The camera lens system is typically connected to the camera base in a manner such that the camera lens system is able to move in response to one or more control signals. By moving the camera lens system, the view of the scene presented to remote conference participants changes according to the control signals.

Further, the camera lens system may pan, tilt and zoom in and out. "Pan" refers to a horizontal camera movement along an axis (i.e., the X-axis) either from right to left or left to right. "Tilt" refers to a vertical camera movement along an axis either up or down (i.e., the Y-axis). "Zoom" controls the field of view (i.e., the Z-axis) of a video image by varying focal length.

A lens motor is coupled to the lens mechanism to mechanically change the field of view by "zooming in" and "zooming out". The lens motor performs the zoom function under the control of a lens controller. The lens motor and other motors associated with the camera (i.e., tilt motor and pan motor drive) are electromechanical devices that use electrical power to mechanically manipulate the image viewed by, for example, geographically remote participants. The tilt motor and drive is included in the lens system and provides for a mechanical means to vertically move the image viewed by the remote participants.

The video image captured by the camera is displayed on a display operating on a display monitor either at the near-end and/or at the far-end side of the conference. The display monitor can be a television, computer, stand-alone display (e.g., a liquid crystal display, "LCD"), or the like and can be configured to receive user inputs to manipulate images displayed on the display.

There exist many drawbacks inherent in conventional cameras used in traditional teleconference applications. Electromechanical panning, tilting, and zooming devices add significant costs to the manufacture of the camera. Furthermore, these devices also decrease the overall reliability of the camera. Since each element has its own failure rate, the overall reliability of the camera is detrimentally impacted with each added electromechanical device. This is primarily because mechanical devices are more prone to motion-induced failure than non-moving electronic equivalents.

Furthermore, switching between preset views associated with predetermined zoom and size settings for capturing and displaying images take a certain interval of time to adjust. This is primarily due to lag time associated with mechanical device adjustments made to accommodate switching between preset views. For example, a maximum zoom out may be preset on power-up of a data conference system. A next preset button, when depressed, can include a predetermined "pan right" at "normal zoom" function. In a conventional camera, the mechanical devices associated with changing the horizontal camera and zoom lens positions take time to adjust to the new preset level, thus inconveniencing the remote participants.

Another drawback to conventional cameras used in video conferencing application is that the camera is designed primarily to provide one view to a remote participant. For example, if a display with two views were requested at a remote participant site, e.g. one survey picture and one zoomed picture, then two independently operable cameras thus would be required.

A participant in a face to face meeting usually changes field of view, typically by focusing on the talker, one of the listeners or trying to keep an overview of all/several participants. State of the art video conferencing equipment usually brings one image from the remote side. This image is often a scaled down version of the camera input. The drawback is of course that a quick change or switching between fields of view is not possible.

U.S. patent application Ser. No. 10/358,758 discloses a method and apparatus for digital zoom, pan and tilt within a visual angle of the camera lens by decreasing/increasing the number of captured and transferred pixels in response of a control signal from the far- or near-end. In this way the user have a feeling of controlling the camera without requiring any mechanical changes. However, the resolution of the picture section within the view of angle is still limited to the mechanical zoom of the camera, and there are no scaling apart from capturing more or less of the pixels being available from the sensors in the camera. In fact, the application merely discloses state of the art digital zoom used in video conferencing application.

SUMMARY

The invention is related to video conferencing systems, and in particular to video compression and user control of picture layout.

In particular, the present invention discloses method and apparatus for providing a sectional video view with a controllable zoom, pan and tilt defined by a boundary within a general video view captured by a first camera of an end-point by consecutively capturing video images of the general view which are being processed by a coding process, creating a first coded video signal representing the general view, at least generating a predicted video image of a first current video image and subtracting the prediction from the first current video image, wherein the coding process further includes the steps of receiving a control signal defining the boundary within the general video view, extracting a first set of pixel values lying within the boundary in the first current video image or in a second current video image captured by a second camera, and creating a residual of the sectional video image by subtracting a second set of pixel values from said first set of pixel values, and creating a second coded video signal representing the sectional video view by further compressing the residual according to the coding process.

BRIEF DESCRIPTION OF THE DRAWINGS

In order to make the invention more readily understandable, the discussion that follows will refer to the accompanying drawings.

DETAILED DESCRIPTION

Representing moving pictures requires bulk information as digital video typically is described by representing each pixel in a picture with 8 bits (1 Byte). Such uncompressed video data results in large bit volumes, and cannot be transferred over conventional communication networks and transmission lines in real time due to limited bandwidth.

Thus, enabling real time video transmission requires a large extent of data compression. Common video coding methods are described in standards such as the MPEG2, MPEG4, ITU-T/H.261 to H.264 standards. The video data undergo four main processes before transmission, namely prediction, transformation, quantization and entropy coding.

The prediction process significantly reduces the amount of bits required for each picture in a video sequence to be transferred. It takes advantage of the similarity of parts of the sequence with other parts of the sequence. Since the predictor part is known to both encoder and decoder, only the difference has to be transferred. This difference typically requires much less capacity for its representation. The prediction is mainly based on picture content from previously reconstructed pictures where the location of the content is defined by motion vectors.

The present invention utilizes the characteristics of these coding techniques for providing a dual or multi display of the far-end side at the near-end, without requiring more than one camera at the far-end. For the sake of simplicity, the embodiment described herein applies dual display, even though the invention is applicable for multi display. The dual display may be presented at the near-end side by either two monitors or a split screen. The present invention seeks to improve the viewer's flexibility as to which part of the camera input he wants to have a closer look at.

Figure 1:
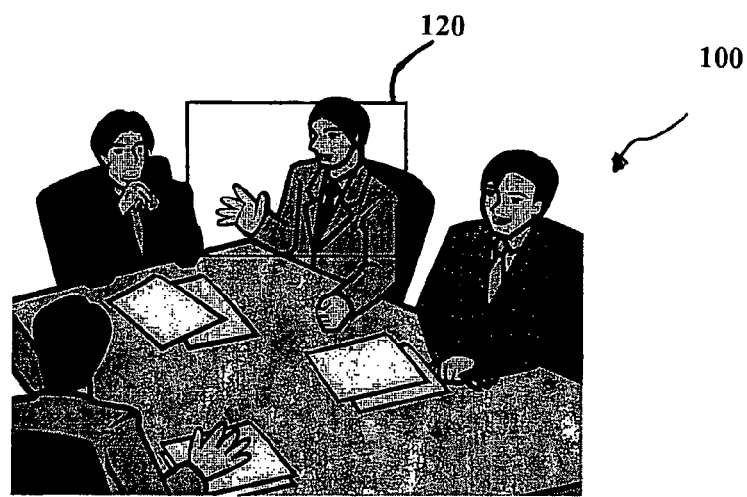
FIG. 1 shows an example of a general view with a subsection of interest indicated with a rectangle.
Figure 2:
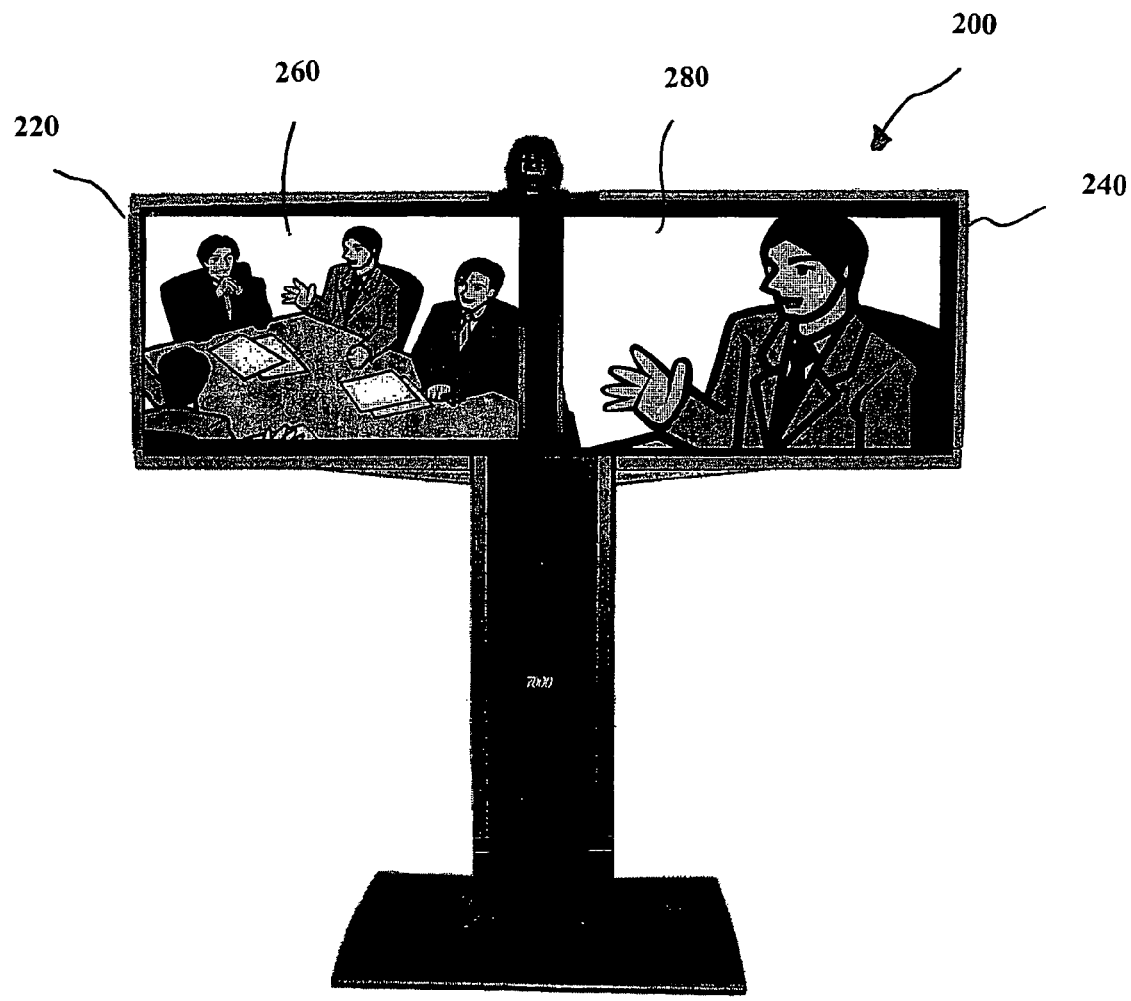
FIG. 2 shows a video conference end-point displaying the general view and the subsection of interest in different displays.

According to a preferred embodiment of the invention, one image shows an overview image of a scene at the far end side (main view), e.g. a meeting room, while a second image shows a subsection of the overview image (selected view). FIG. 1 illustrates a section of the scene 100 at the far-end side that the camera is capturing. Within the main view, the selected view 120 is indicated with a rectangle. FIG. 2 shows an end-point 200 at the near-end side with two monitors 220, 240, the one 220 showing the main view 260, and the second 240 showing the selected view 280 indicated by the rectangular in FIG. 1.

Figure 3:
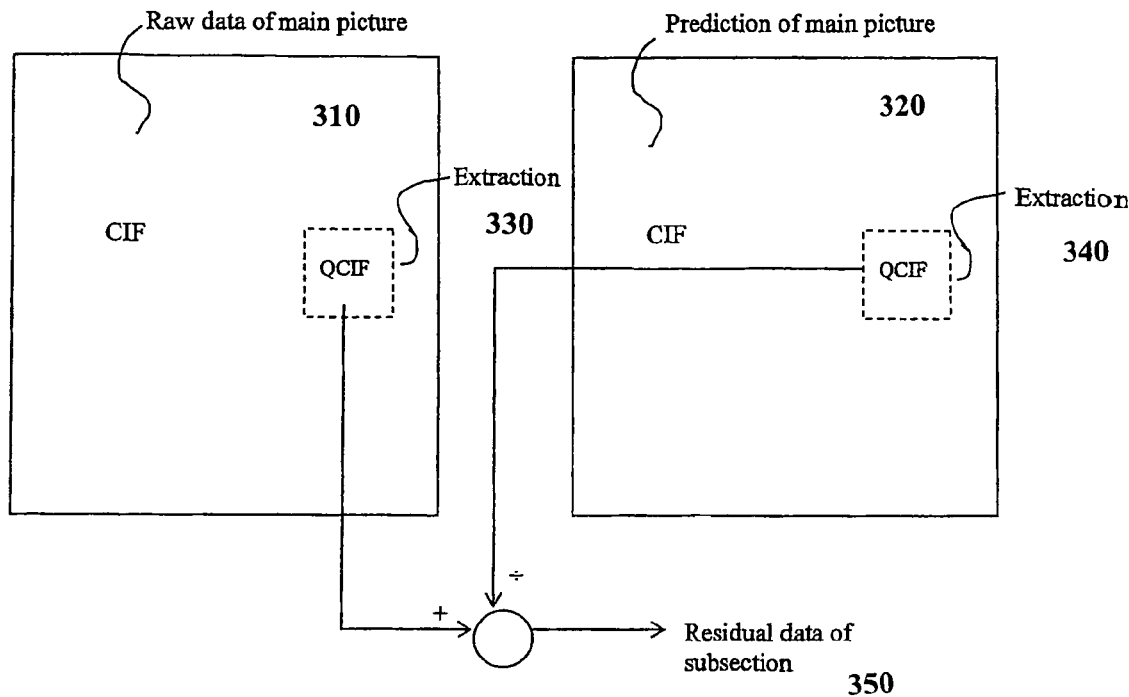
FIG. 3 is an illustration of the first aspect of a preferred embodiment of the present invention.

According to the preferred embodiment of the present invention, the selected view may be coded based on the prediction of the main view. As mentioned above, one of the steps in video coding is to predict the current video picture from previous picture as described e.g. in the ITU-T Recommendation H.264. Conventionally, the predicted values of all the pixels in a picture are subtracted from all the actual pixel values of current picture. The preferred embodiment of the present invention provides a separate extraction of the prediction data of the requested subsection from the main picture and subtracting it from the corresponding raw data. This will create a residual data representation of the subsection of interest without the need of a separate prediction process for the selected view. The principle is illustrated in FIG. 3, which shows the raw data 310, extraction of the raw data 330, the prediction data 320, the extraction of the prediction data 340, and residual data 350.

For the selected view to be presented in a large size at the near-end, some data or processing should be added to the residual data to improve visibility, or a scaling of the prediction data in the corresponding field in the main picture should preferably be carried out.

As an example of the first aspect of the preferred embodiments of the present invention, if the main picture has a CIF format, which is a standardized video format of 352×288 pixels, the selected view may be extracted as QCIF (176× 144). To compensate for the reduced resolution, at least two possible steps for providing additional data may be carried out. One step is to increase the frame rate of the subsection of interest relative to the frame rate of the main picture. If the frame rate of the main view is 15 fps, the frame rate of the selected view could be increased to 30 fps. As the subsection normally is a close-up of something in the main picture, it will normally contain more movements and therefore a smoother readout will be required. Another step is to alter the quantization rate in the encoding process. As earlier mentioned, the video data undergo quantization after having transformed the residual data. The purpose of the transformation is to reduce the number of non-zero values to be transmitted without losing significant information, and the purpose of quantizing the remaining values is to reduce the number of bits for representing each value. However, some information is lost in the quantization process, and the larger the quantization interval the more is lost. This will appear at the receiver as quantization noise. For a "magnified" picture as for the selected view in the present invention, quantization noise will be even more annoying. To compensate for this, the transformed residual of the subsection may be quantized with a higher resolution, i.e. with a smaller quantization interval than for the main picture. This will require a data addition with a higher number of bits per value, but the subsection can on the other hand be coded in a format of a lower resolution, e.g. in QCIF.

Figure 4:
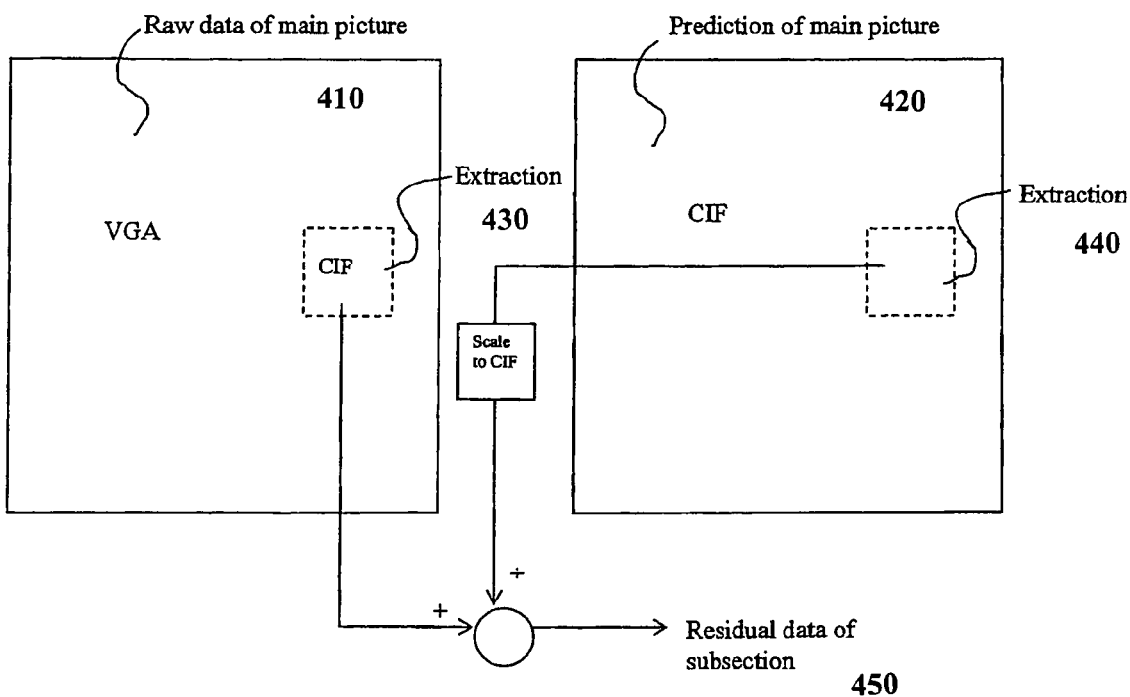
FIG. 4 is an illustration of the second aspect of a preferred embodiment of the present invention.

In the second aspect of the preferred embodiment of the present invention, the selected view has a higher resolution than the main view utilizes. As an example, the view captured by the camera may be represented in a format with a higher resolution than the one being used by the encoder. The pictures captured by the camera may be provided in a VGA format (640×480) and scaled down to CIF before coding, e.g. by respectively averaging a set of pixel values in the VGA format to a value representing one pixel in the CIF format. FIG. 4 illustrates how this can be utilized by the present invention. On the left hand side is sketched a VGA format picture 410 of the main view captured by the camera. A rectangular field of pixels 430 corresponding to the CIF format is extracted around the selected view. A corresponding rectangular field 440 within the main view of prediction data 420 in CIF format is extracted. The extracted field is then scaled to match the CIF format of the extraction of the VGA picture, from which it is subtracted. The scaling mechanism can be of any kind known in related art, including some kind of interpolation. The resulting residual data 450 is then further encoded, transmitted and finally decoded by the receiver according to the standard being used.

In a third aspect of the present invention, the prediction data is generated from previous images of the selected view rather than extracting the data from the prediction of the main view. The prediction may be accomplished by conventional prediction techniques by using i.a. motion vectors, but is separately carried out on the selected view. If necessary, the prediction data is scaled and thereafter subtracted from the corresponding raw pixel data in the main view, so as to create the residual data. A combination of the methods would give an even better ability to handle various situations such as startup, and people moving in and out of views.

An alternative embodiment of the invention includes a second camera capturing the same view or substantially the same view as the main view captured by the first camera. The raw data of the selected view is then extracted from the view captured by the second camera while the corresponding prediction data is extracted from the selected view in the main view captured by the first camera. The residual data of the selected view is then generated by subtracting the prediction data extracted from the prediction of the main view captured by the first camera from the raw data extracted from the view captured by the second camera. This will also create a residual data representation of the subsection of interest without the need of a separate prediction process for the selected view.

Selection of the selected view may be accomplished in the same way as when providing zoom, tilt and pan by mechanically controlling the camera, either from the near-end or the far-end side. The zoom, tilt and pan position may be controlled by a remote or by a camera tracking mechanism installed in the end-point. In the case of the present invention however, the selection does not affect the view being captured by the camera, but on the position of the boundaries within the main view defining the selected view. For example, when a user presses the zoom button on his remote control, the vertical and horizontal pixel addresses within the main view representing the boundaries of the subsection of pixels being extracted from the main picture are changed accordingly. Another refinement of this invention is that when the selected view moves towards the boundaries of the main view, the camera may be told to do physical panning and zoom, to better show the surroundings of the selected view in the main view, and to give the user the possibility to move further. The position data of the selected view then needs to be recalculated, according to the physical camera movement.

Figure 5:
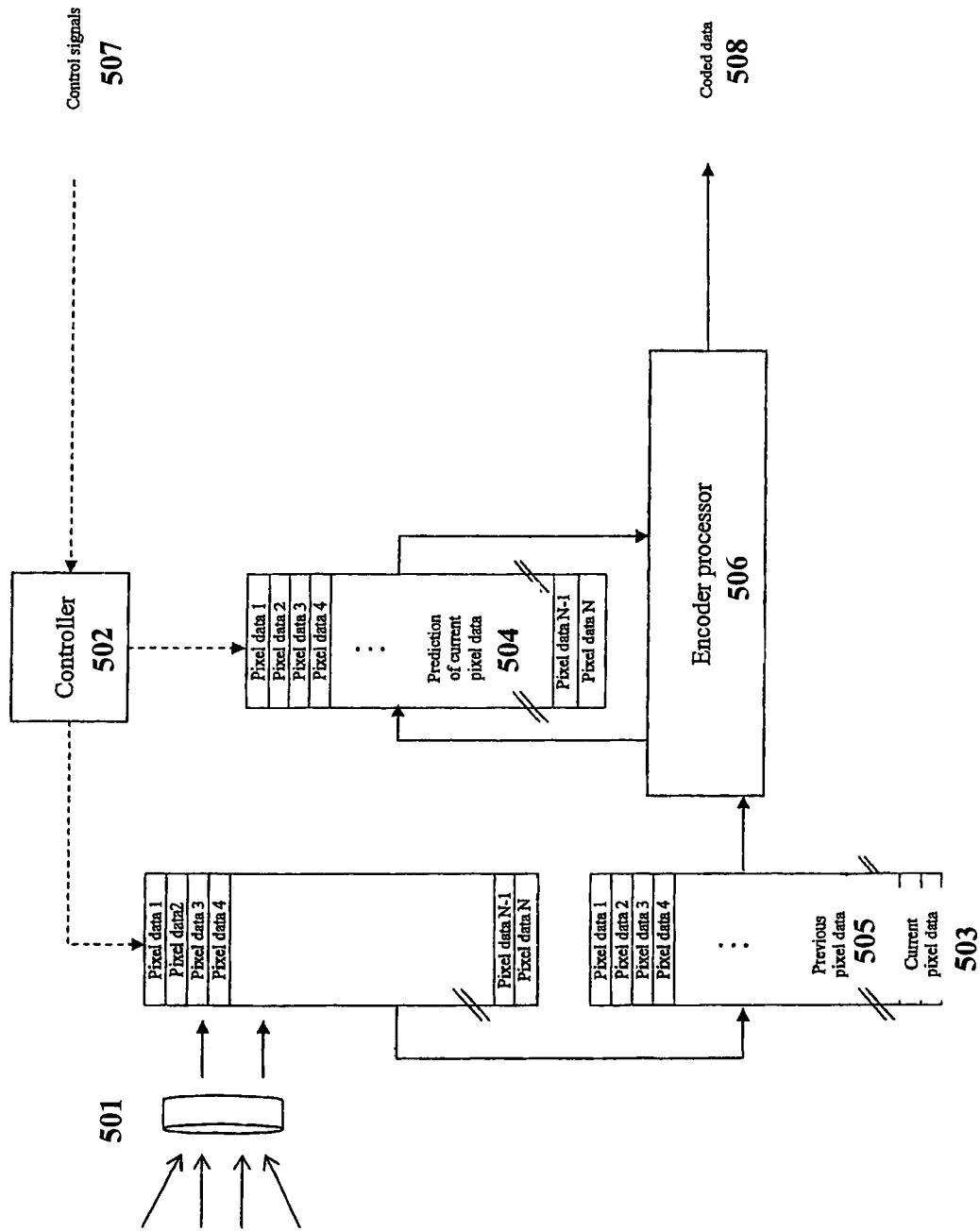
FIG. 5 is a principal illustration of an example architecture of a codec employing the present invention.

FIG. 5 is a principal architecture of an example embodiment of the present invention. Here, raw pixel data of the main view is provided from the optical input (501). The pixel data of the current video picture is stored in a first memory circuit (503). The prediction data for the current picture is stored in a second memory circuit (504), and is concurrently provided from the encoder processor (506) based on the pixel data of the current and the previous video picture 505. As indicated in the figure, the data of the memory circuits is addressable, allowing a controller (502) to control which pixel data to be read out to the encoder processor (506). The controller (502) is therefore able to extract the current pixel data and the corresponding prediction data of the selected view only from the respective memory circuits, based on an external control signal 507 e.g. from a remote control. The encoder processor 506 is configured to provide a subtraction of raw pixel data with the corresponding prediction data, and to provide the required data adding or data scaling for the two aspects of the present invention, respectively. Preferably, the encoder processor also carries out all the other required encoding steps according to the standard being used, and then outputs the selected subsection of the main picture in a coded format 508.

The endpoints in the conference call will exchange video streams and control signals. The control signals may be sent in-band so that a video stream may consist of commands, information and video data for the available views. The commands may also be transmitted out of band, with the video data contained in one video stream, or several video streams covering one or more views.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for providing a sectional video view with a controllable zoom, pan and tilt defined by a boundary within a general video view captured by a first camera of an end-point comprising:
   consecutively capturing, at an encoding apparatus, video images of the general view which are processed by a coding process;
   creating, at the encoding apparatus, a first coded video signal representing the general view;
   generating, at the encoding apparatus, a predicted video image of at least a first current video image;
   subtracting, at the encoding apparatus, the predicted video image from the first current video image;
   receiving, at the encoding apparatus, a control signal defining the boundary within the general video view;
   extracting, at the encoding apparatus, a first set of pixel values lying within the boundary in the first current video image or in a second current video image captured by a second camera to create a sectional video view;
   extracting, at the encoding apparatus, a second set of pixel values from the predicted video image corresponding to the first set of pixel values;
   creating, at the encoding apparatus, a residual of the sectional video view by subtracting the second set of pixel values from said first set of pixel values; and
   creating, at the encoding apparatus, a second coded video signal representing the sectional video view by further compressing the residual according to the coding process.

2. The method according claim 1, wherein said second set of pixel values are pixel values extracted from the predicted video image lying within said boundary.

3. The method according claim 1, further comprising:
   transmitting the first and the second coded video signal to a receiving end-point, and
      decoding the first and the second coded video signal with a decoding process corresponding to the coding process, resulting in the general video view and the sectional video view.

4. The method according to claim 3, further comprising:
   displaying the general video view and the sectional video view at said receiving end-point.

5. The method according to claim 1, wherein the coding process further includes at least one of the following steps:
   scaling said first set of pixel values to match with said second set of pixel values, and
   scaling said second set of pixel values to match with said first set of pixel values.

6. The method according to claim 1, wherein the coding process further includes adjusting a second frame rate associated with said second coded video signal relative to a first frame rate associated with the first coded video signal.

7. The method according to claim 1, wherein said control signal originates from a selection device connected to a transmitting end-point.

8. The method according to claim 7, wherein the selection device is a remote control.

9. The method according to claim 1, wherein said control signal originates from a selection device connected to said receiving end-point.

10. The method according to claim 9, wherein the selection device is a remote control.

11. The method according to claim 1, wherein said control signal is provided by a camera tracking mechanism in a transmitting end-point.

12. An apparatus for providing a sectional video view with a controllable zoom, pan and tilt defined by a boundary within a general video view captured by a first camera of an end-point comprising:
- means for consecutively capturing video images of the general view which are being processed by a coding process,
- means for creating a first coded video signal representing the general view,
- means for generating a predicted video image of at least a first current video image and subtracting the predicted video image from the first current video image,
- means for receiving a control signal defining the boundary within the general video view,
- means for extracting a first set of pixel values lying within the boundary in the first current video image or in a second current video image captured by a second camera so as to create a sectional video view,
- means for extracting a second set of pixel values from the predicted video image corresponding to the first set of pixel values,
- means for creating a residual of the sectional video view by subtracting the second set of pixel values from said first set of pixel values, and
- means for creating a second coded video signal representing the sectional video view by further compressing the residual according to the coding process.

13. The method according to claim 1, wherein the coding process further includes adjusting a second number of quantization intervals associated with said second coded video signal relative to a first number of quantization intervals associated with the first coded video signal.

14. An apparatus for providing a sectional video view with a controllable zoom, pan and tilt defined by a boundary within a general video view captured by a first camera of an end-point comprising:
- an input to consecutively capture video images of the general view which are being processed by a coding process; and
- a processing device to
  - create a first coded video signal representing the general view,
  - generate a predicted video image of at least a first current video image,
  - subtract the predicted video image from the first current video image,
  - receive a control signal defining the boundary within the general video view,
  - extract a first set of pixel values lying within the boundary in the first current video image or in a second current video image captured by a second camera so as to create a sectional video view,
  - extract a second set of pixel values from the predicted video image corresponding to the first set of pixel values,
  - create a residual of the sectional video view by subtracting the second set of pixel values from said first set of pixel values, and
  - create a second coded video signal representing the sectional video view by further compressing the residual according to the coding process.

* * * * *